Figure 1:
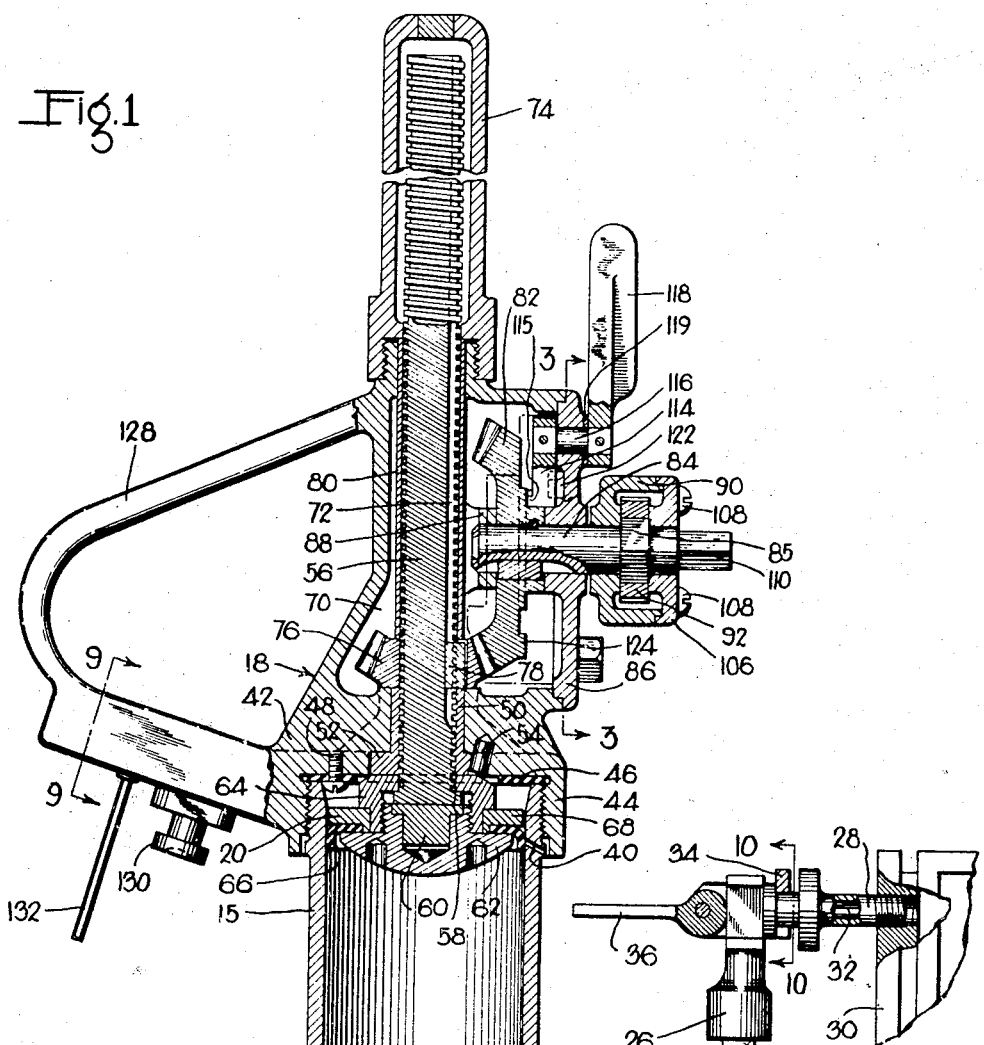

Jan. 3, 1939.   E. E. HEWITT   2,142,189
GREASE GUN
Filed July 17, 1936   3 Sheets-Sheet 1

INVENTOR
ELLIS E. HEWITT
BY Wm. M. Cady
ATTORNEY

Jan. 3, 1939.  E. E. HEWITT  2,142,189
GREASE GUN
Filed July 17, 1936   3 Sheets-Sheet 2
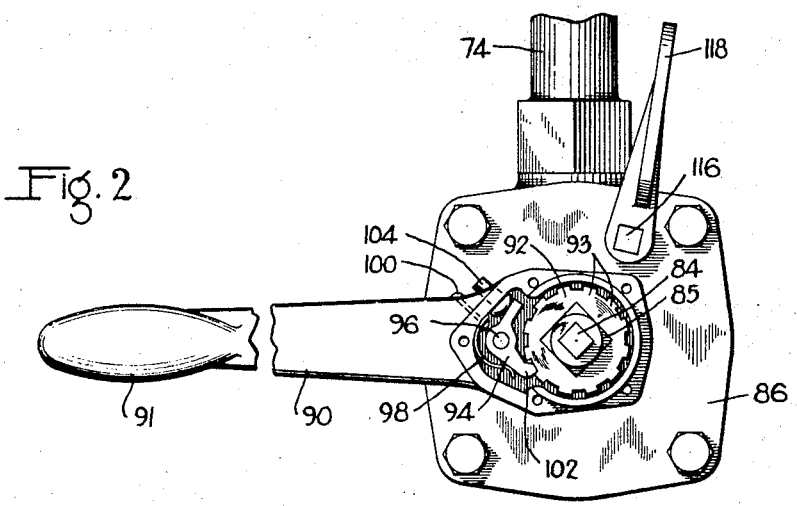
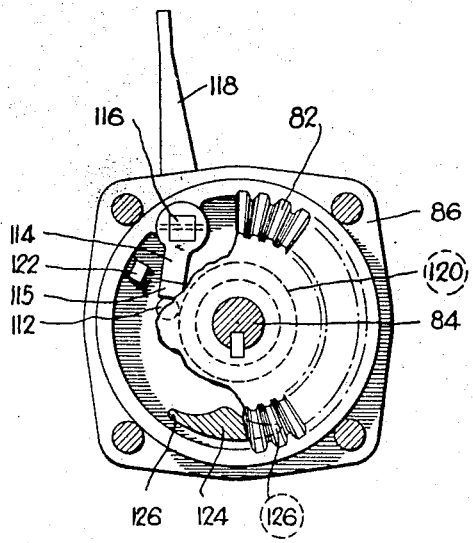
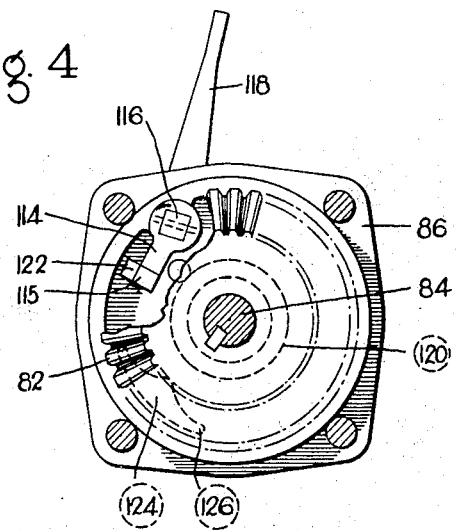
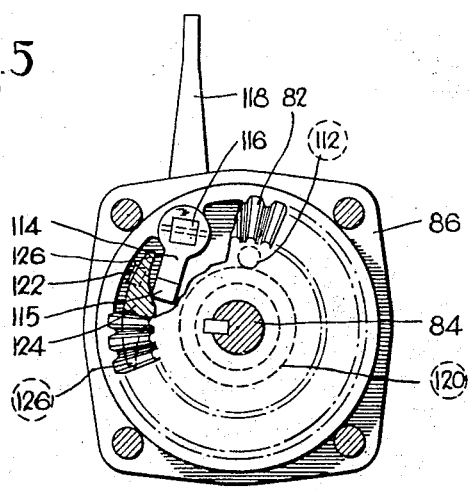
INVENTOR
ELLIS E. HEWITT
BY *Wm. M. Cady*
ATTORNEY Jan. 3, 1939.  E. E. HEWITT  2,142,189
GREASE GUN
Filed July 17, 1936  3 Sheets-Sheet 3

INVENTOR
ELLIS E. HEWITT
BY *Wm. N. Cady*
ATTORNEY

Patented Jan. 3, 1939

2,142,189

UNITED STATES PATENT OFFICE 2,142,189

GREASE GUN

Ellis E. Hewitt, Edgewood, Pa., assignor to The Westinghouse Air Brake Company, Wilmerding, Pa., a corporation of Pennsylvania Application July 17, 1936, Serial No. 91,053

16 Claims. (Cl. 221—80)

This invention relates to a grease or lubricant dispensing device and more particularly to a device adapted to supply grease or lubricant in measured or predetermined quantities.

It is an object of this invention to provide a grease gun or lubricant supply device adapted to supply grease or semi-fluid lubricant under pressure to a lubricant passage.

A further object of the invention is to provide an improved grease gun having a reservoir of relatively large capacity, and being adapted to supply lubricant therefrom under relatively high pressure.

Another object of the invention is to provide a grease gun adapted to supply lubricant in predetermined, measured quantities.

A further object of the invention is to provide a grease gun having a cylinder adapted to contain a quantity of lubricant, a piston in the cylinder for forcing lubricant therefrom, together with releasable latch or locking means operative to prevent further movement of the piston after a predetermined amount of movement thereof, whereby the amount of grease or lubricant expelled by the piston is limited.

Another object of the invention is to provide a grease gun of the type described having a manually operable lever for effecting movement of the piston, and having a ratchet connecting the lever with the piston.

A further object of the invention is to provide a grease gun of the type described, and having manually operable means for releasing the latch or locking means so as to permit further movement of the piston.

Another object of the invention is to provide a grease gun of the type described and incorporating means automatically operable on release of the latch or locking means, and on further movement of the piston, to reset the latch or locking means so that it will again operate to limit movement of the piston after a predetermined amount of movement thereof.

A further object of the invention is to provide a grease gun of the type described, and in which the latch or locking means is arranged to permit free movement of the piston in one direction so that the piston may be returned to one end of its range of movement preparatory to refilling of the lubricant reservoir.

Another object of the invention is to provide a grease gun of the type described which supplies grease or lubricant under high pressure, but which can be operated readily even though the lubricant is stiff and does not flow freely.

Figure 10:
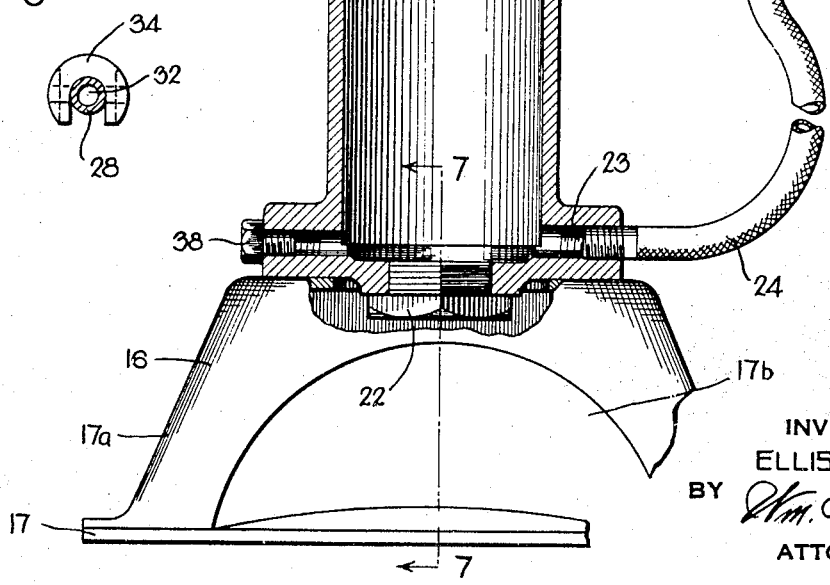
Figure 6:
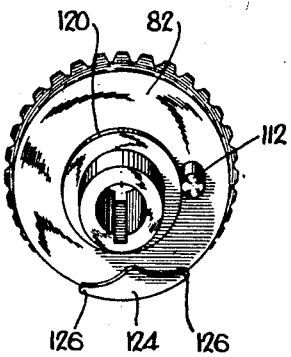
Figure 7:
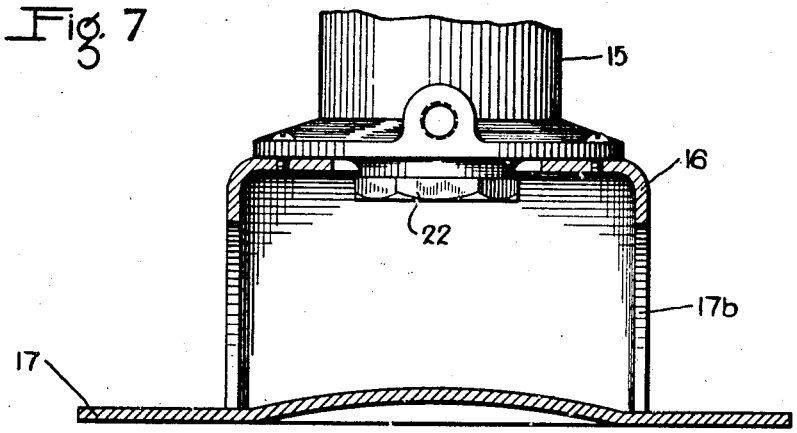
Figure 8:
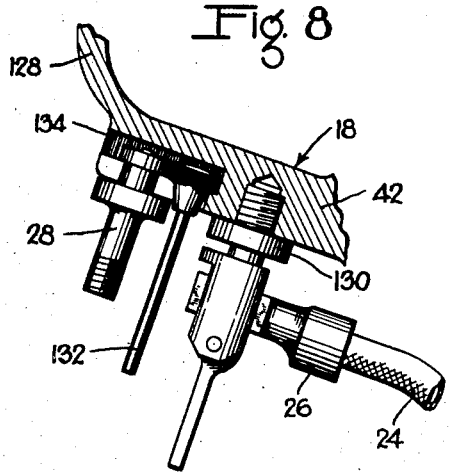
Figure 9:
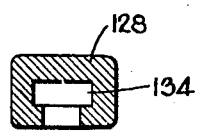

Other objects of the invention and features of novelty will be apparent from the following description taken in connection with the accompanying drawings, in which Fig. 1 is an elevational view, largely in section, of a grease gun embodying my invention, Fig. 2 is a fragmentary enlarged view of a portion of the grease gun shown in Fig. 1, Fig. 3 is a sectional view taken substantially along the line 3—3 of Fig. 1, with parts broken away to more clearly disclose other parts, Figs. 4 and 5 are views similar to Fig. 3, but showing the parts in somewhat different operating relation, Fig. 6 is a perspective view of one of the gears employed in this device, Fig. 7 is a sectional view taken substantially along the line 7—7 of Fig. 1, Fig. 8 is a fragmentary sectional view of a portion of the grease gun shown in Fig. 1, Fig. 9 is a sectional view taken substantially along the line 9—9 of Fig. 1, and Fig. 10 is a sectional view taken substantially along the line 10—10 of Fig. 1.

Referring to the drawings, the grease gun provided by this invention has a cylinder barrel 15, which is secured to a base 16, which may be any suitable construction, and which serves to support the entire assembly and prevent it from overturning.

As shown, the base 16 comprises a base plate 17 having a raised central portion, and having secured thereto by suitable means, such as welding, a member 17a to which the cylinder barrel 15 is attached. The member 17a extends upwards from the base plate 17 a substantial distance, and has formed therein on opposite sides thereof, substantially semi-circular openings 17b, as is best shown in Fig. 1 of the drawings, which are adapted to receive the foot of a workman.

The cylinder barrel 15 is threaded adjacent its upper end, and has detachably secured thereon a head assembly indicated generally by the reference numeral 18. The head assembly 18 carries a piston indicated generally by the reference numeral 20, which is reciprocable in a bore in the cylinder barrel 15.

The lower end of the cylinder barrel 15 has a threaded opening therein which is closed by means of a plug 22, while a discharged opening 23 communicates with the lower end of the bore in the cylinder barrel and has secured therein a flexible conductor 24, which may be of any suitable construction, and which has at the end thereof a coupling device 26, which is adapted to be detachably secured to a fitting 28 secured in an opening in a brake cylinder 30 of a fluid pressure brake equipment, or other piece of apparatus to be lubricated.

The coupling device 26 and the fitting 28 may be of any suitable construction, but I prefer to use the type shown in the drawings. This coupling and fitting are disclosed and claimed in the copending application of C. C. Farmer, filed July 17, 1935, Serial No. 31,758.

The fitting 28 comprises a body having a passage 32 extending therethrough and having a threaded end portion adapted to be secured in a threaded opening in a device to be lubricated. The fitting 28 has a relatively large flange intermediate the ends thereof, and has adjacent the end thereof a smaller flange which is adapted to be engaged by a member 34 of the coupling 26. The coupling 26 has a cam lever 36 for operating the member 34 to rigidly secure the coupling to the fitting 28 with the passage through the flexible conduit 24 in communication with the passage 32 through the fitting 28.

The lower end of the bore in the cylinder 15 has another threaded opening therein which is closed by means of a plug 38, while a vent passage 40 extends through the wall of the cylinder barrel 15 at a point adjacent the upper end thereof.

The head assembly 18 comprises a body 42 having a flange 44 formed thereon, which has its inner face threaded so as to receive the threaded upper end of the cylinder barrel 15, while a gasket 46 is secured to the face of the body 42 by means of screws 48, one of which is shown, so as to be engaged by the end of the cylinder barrel 15.

The body 42 has a bore therein located substantially in axial alignment with the bore in the cylinder barrel 15 when the body 42 is secured on the cylinder barrel, and a threaded bushing 50 is mounted in this bore. The bushing 50 has a flange 52 thereon which prevents movement of the bushing away from the cylinder barrel 15, while a pin 54 extends through aligned openings in the flange 52 and in the face of the body 42 so as to prevent rotation of the bushing 50.

A threaded rod 56 extends through the bore in the bushing 50 and terminates in an enlarged head 58, which is adapted to engage a wear resisting insert 60 in a member 62 of the piston 20. The member 62 has a threaded boss thereon on which is secured a member 64, which secures the piston 20 to the end of the rod 56 so as to prevent relative axial movement therebetween. The member 64 also serves to clamp a packing cup 66 between the member 62 and a backing plate 68.

The rod 56 extends through a chamber 70 in the body 42, and has a key-way 72 cut therein which extends substantially the entire length of the rod. The rod 56 is of such length as to extend above the body 42 in certain positions of the piston, and the upper end of the rod 56 is enclosed by a cap 74 which is secured to the body 42.

A bevel gear 76 is mounted on the shaft 56 so as to be movable axially thereof, but is prevented from rotating relative to the shaft 56 by means of a key 78 which extends into the key-way 72 in the rod 56.

One face of the gear 76 engages a portion of the body 42, while the other face of the gear 76 is engaged by the end of a tube 80, the other end of which is engaged by the cap 74. The tube 80 serves to prevent upward movement of the gear 76, and also serves to prevent displacement of the key 78.

The teeth on the bevel gear 76 are engaged by teeth on a bevel gear 82, which is rigidly secured on a shaft 84, which is journaled in a bore in a cover plate 86. The shaft 84 extends through the gear 82 and the end thereof is rotatably supported in a bore in a bracket 88 which extends across the chamber 70 in the body 42.

The shaft 84 has a square section, indicated at 85, formed thereon and this section is of somewhat larger size than the other portions of the shaft. A lever 90 is mounted on the shaft 84 at a point intermediate the square section 85 and the face of the cover 86. The lever 90 is freely rotatable relative to the shaft 84, and has formed adjacent the end thereof a handle portion 91 adapted to be gripped by the hand of a workman.

A member 92, having a square opening therein of substantially the same size as the portion 85 of the shaft 84, is mounted on the square portion 85 of the shaft 84. The member 92 is of substantially the same thickness as the square section 85 on the shaft 84 and has splines, indicated at 93, formed in the periphery thereof, as is best shown in Fig. 2 of the drawings.

The lever 90 has a cavity formed in the face thereof, and a pawl 94 is positioned in this cavity and is pivotally mounted on a pin 96 carried by the lever 90. A spring 98 is secured to the lever 90 by a rivet 100, and presses against the pawl 94 so as to hold an end 102 thereof in engagement with the member 92.

The end 102 of the pawl 94 has a face thereon adapted to engage a spline 93 on the member 92 on rotation of the lever 90 in a counterclockwise direction, as viewed in Fig. 2 of the drawings, so that the member 92 will be turned. The end 102 of the pawl 94 has another face thereon which is angularly disposed so that on movement of the lever 90 in a clockwise direction, as viewed in Fig. 2 of the drawings, this face of the pawl 94 will ride over the splines 93 on the member 92, thereby moving the pawl against the spring 98 and permitting the lever 90 to be turned relative to the member 92.

A manually operable release plunger 104 is provided, and, as shown, comprises a short round shaft having a head formed thereon engaging the pawl 94 on the side of the pin 96 opposite from the point on the pawl engaged by the spring 98. When pressure is applied to the exposed end of the plunger 104, the head thereof presses against the pawl 94 so that the end 102 of the pawl 94 is moved against the spring 98 and out of the path of movement of the splines 93 on the member 92.

A cover 106 is provided for the cavity in the lever 90, and this cover is held in place by means of screws 108. The cover 106 has a portion which substantially engages the face of the square section 85 on the shaft 84, and cooperates with the lever 90, which is substantially in engagement with the other face of the square section 85, to prevent movement of the lever 90 axially of the shaft 84, and to maintain the member 92 in place on the square section 85 on the shaft 84.

The shaft 84 extends through the cover 106 and is provided with a square end portion, indicated at 110, which is adapted to receive a wrench or handle having a square socket therein, so that shaft 84 may be rotated relative to the lever 90, as will hereinafter more fully appear.

The grease gun provided by this invention incorporates means to prevent further movement of the piston 20 after a predetermined amount of movement thereof so that lubricant will be discharged from the gun in predetermined amounts. This means comprises a pin 112, which is secured in a bore in gear 82, and projects therefrom so as to engage the end of an arm 114 in one position of the arm. The arm 114 is mounted in the cavity 70 in the body portion 42, and is secured on a short shaft 116, which extends through a bore in the cover 86 and has secured on the other end thereof a lever 118. A spring washer 119 is mounted on the shaft 116 between the lever 118 and the cover 86, and exerts force through the lever 118 and the shaft 116 to press the arm 114 firmly against the face of the cover 86 so that considerable friction is developed between the arm 114 and the cover 86. There will, therefore, be a considerable resistance to movement of the arm 114 and of the lever 118, and these will remain in the position in which they are moved.

The face of the gear 82 has a shoulder 120 formed thereon radially inwardly of the pin 112, and this shoulder is adapted to be engaged by a portion of the end of the arm 114 to limit movement of the arm in a counterclockwise direction, as viewed in Figs. 3, 4 and 5 of the drawings. This is the latching or locking position of the arm 114.

The shoulder 120 on the gear 82, the pin 112 carried thereby, and the shaft 116 on which the arm 114 is mounted, are arranged so that when the inner end of the arm 114 is in engagement with the shoulder 120 and the pin 112 presses against the end of the arm 114, the arm 114 and the shaft 116 are disposed substantially in a plane tangent to a circle passing through the center of the pin 112 and having its center at the axis of the shaft 84 so that substantially no force is exerted on the arm 114 tending to turn it out of the path of movement of the pin 112.

The arm 114 has formed on the free end thereof a boss 115 which projects therefrom away from the cover 86 a short distance, as is best shown in Fig. 1 of the drawings. The end of the boss 115 is substantially in engagement with the face of the gear 82 while a portion of the boss engages the shoulder 120 on the gear 82.

The cover 86 has a projection 122 formed thereon and adapted to be engaged by the arm 114 to limit movement of the arm in a clockwise direction, as viewed in Figs. 3 to 5 of the drawings. This is the release position of the arm 114. The projection 122 extends from the face of the cover 86 only a short distance so as to be engaged only by the portion of the arm 114 adjacent the cover 86. The projection 122 preferably does not extend in the plane of the boss 115 in the end of the arm 114. The relationship of these parts is best shown in Fig. 1 of the drawings.

The gear 82 has formed on the face thereof a projection indicated generally by the reference numeral 124, and this projection extends from the face of the gear 82 a shorter distance than the boss 115 on the end of the arm 114 extends from this arm. The projection 124 is symmetrical in shape, and has narrow end portions 126, which terminate in rounded points which are located radially outwardly of the boss 115 on the lever 114 when the lever 114 is in engagement with the projection 122. The mid portion of the projection 124 is of such width, and extends radially inwardly to a point, such that it will pass radially outwardly of the boss 115 on the arm 114 when the end of the arm 114 is substantially in engagement with the shoulder 120 on the gear 82.

The body 42 of the cover assembly 18 has formed integral therewith a handle 128 by means of which the grease gun may be carried by a workman. The lower portion of the handle has a dummy fitting 130 secured thereto, and this fitting is adapted to have the coupling 26 on the end of the flexible conduit 24 connected thereto when the gun is not in use.

This portion of the handle 128 also has formed therein a T-slot 134, as is best shown in Fig. 9 of the drawings, which is adapted to receive the head of a tool 132 and to also receive a fitting 28 of the type adapted for use with the coupling 26.

In order to fill the gun with lubricant, the piston 20 is first moved substantially to the upper end of the bore in the cylinder barrel 15, if it is not already in this position. The piston 20 may be readily moved to this position by applying pressure to the release plunger 104 carried by the lever 90, to move the end 102 of the pawl 94 out of engagement with the splines 93 on the member 92.

The shaft 84 may now be turned in a clockwise direction, as viewed in Fig. 2 of the drawings, by a wrench which engages the faces of the square end portion 110 of the shaft 84. This movement of the shaft 84 causes the gear 82 to turn the gear 76, and rotation of the gear 76 is transmitted through the key 78 to the rod 56 to turn the rod 56 in the bushing 50 in a direction to cause the rod 56 and piston 20 to move upwardly.

After the piston 20 is moved to the upper end of the bore in the cylinder barrel 15, the cover assembly 18 is unscrewed from the cylinder barrel 15 and is removed therefrom. The bore in the cylinder barrel may now be filled in a suitable manner with grease, semi-fluid lubricant or other suitable lubricating material. In order to facilitate the filling of the bore in the cylinder barrel, the plug 38 may be removed to provide a passage for the escape of air from the cylinder barrel.

After the bore in the cylinder barrel is filled with lubricant, the cover assembly is replaced, being turned to a position in which the lever 90 projects from the gun on a side of the base 16 having an opening 17b therein. After the grease or other lubricant has been packed down in the cylinder barrel 15 so as to remove air bubbles therefrom, the plug 38 is replaced. The piston 20 is now forced downwardly in the bore in the cylinder barrel 15 by operating the lever 90. This lever is alternately pushed downwardly and lifted up.

In order to hold the gun firmly and prevent it from overturning while the lever 90 is being operated, the operator may place the toe portion of one of his feet in one of the openings 17b in the base 16 and press downwardly on the raised central portion of the base plate 17.

On downward movement of the handle portion 91 of the lever 90, the end 102 of the pawl 94 is pressed into engagement with a spline 93 on the member 92 so that the shaft 84 is rotated, thereby turning the gear 82 and causing it to turn the gear 76. On this movement of the gear 76, the rod 56 is rotated in a direction which causes the thread thereon to advance in the thread in the bushing 50 and move the piston downwardly in the bore in the cylinder barrel 15, thereby forcing lubricant out through the flexible conduit 24.

On upward movement of the handle portion 91 of the lever 90, the angular face on the end 102 of the pawl 94 rides over the splines 93 with the result that the end 102 of the pawl 94 moves against the spring 98 and no movement of the member 92 occurs. On subsequent downward movement of the handle portion 91 of the lever 90, the end 102 of the pawl 94 is again pressed into engagement with a spline 93 by the spring 98 so that the lever 90 will again turn the shaft 84.

After a limited amount of movement of the gear 82, the pin 112 carried thereby will engage the end of the arm 114 to prevent further rotation of the gear 82, assuming that the arm 114 is in its latching position, which is the position in which it is shown in Fig. 3 of the drawings.

A fitting 28 is now secured in a threaded opening in the apparatus to be lubricated, such as the brake cylinder 30, and the coupling 26 is then connected to this fitting. The lever 118 is next moved in a counterclockwise direction, as viewed in Fig. 2 of the drawings, so as to move the arm 114 from the latching position into engagement with the stop or projection 122 on the cover 86, which defines the release position of the arm 114. The arm 114 is now out of the path of movement of the pin 112 carried by the gear 82 so that the gear 82 may be turned by the lever 90.

The operator now presses downwardly on the handle portion 91 of the lever 90, and the end 102 of the pawl 94 being held by the spring 98 in engagement with a spline 93 on the member 92, the member 92 is turned by the lever 90. After a short downward movement of the lever 90, the handle portion of the lever may be lifted upwardly, the pawl 94 permitting relative movement between the lever 90 and the member 92 in this direction, as explained above. The lever 90 may then be moved downwardly again to effect further rotation of the gear 82, and this process may be continued until the desired amount of movement of the gear 82 is secured.

On rotation of the gear 82, the gear 76 is turned, thereby turning the rod 56 and causing this rod to advance in the threaded bushing 50 so as to force the piston 20 downwardly in the bore in the cylinder barrel 15, thus subjecting the lubricant in the chamber beneath the piston 20 to pressure, and forcing lubricant out through the flexible conduit 24, the coupling 26, and the fitting 28, to the brake cylinder 30, or other apparatus to be lubricated.

On initial movement of the gear 82 subsequent to movement of the arm 114 to the release position, the pin 112 carried by the gear 82 moves past the arm 114, as is best shown in Fig. 4 of the drawings.

After a limited amount of rotation of the gear 82, an end 126 of the projection 124 on the gear 82 is moved between the wall of the chamber 70, and the boss 115 on the end of the arm 114, so that on further rotation of the gear 82, the curved inner surface of the projection 124 engages the boss or projection 115 on the end of the arm 114, and moves the arm in a counterclockwise direction away from the stop 122, as is best shown in Fig. 5 of the drawings.

When the gear 82 has been turned an amount sufficient to move the relatively wide mid-portion of the projection 124 past the boss 115 on the end of the arm 114, the end of the arm 114 will be moved substantially into engagement with the shoulder 120 on the gear 82, and the end of the arm is again substantially in the path of movement of the pin 112. The arm 114 is now in its latching position.

When the gear 82 has been turned substantially one complete revolution by the lever 90, the pin 112 will engage the end of the arm 114 so as to prevent further rotation of the gear 82. As a result of this amount of rotation of the gear 82, the gear 76 and the rod 56 will be rotated a predetermined amount, and the piston 20 will be moved downwardly in the cylinder barrel 15 a predetermined distance, so that a predetermined quantity of lubricant is forced out through the flexible conduit 24 to the apparatus to be lubricated.

The various parts of the grease gun are proportioned so that the quantity of lubricant discharged from this gun as a result of one revolution of the gear 82 is substantially the quantity required to properly lubricate a piece of apparatus, such as a brake cylinder 30, which the gun is designed to lubricate.

The lever 90 is of such length, the ratio of the gears 82 and 76 is so proportioned, and the lead of the thread on the rod 56 is such that a relatively light force applied to the end of the lever 90 results in a comparatively great force being exerted on the piston 20, while the piston 20 is of such diameter that a high pressure will be developed on the lubricant in the cylinder barrel 15 beneath the piston 20. As a result lubricant will be forced out through the flexible conduit under high pressure regardless of the viscosity of the lubricant, while lubricant will be forced through the passage in the apparatus to be lubricated even though there is considerable resistance to the flow thereof.

The coupling 26 may now be detached from the fitting 28, and the fitting may be moved from the brake cylinder 30, and the opening in which the fitting was secured may be closed by a suitable plug, not shown.

The grease gun may now be transported to another piece of apparatus to be lubricated, the handle 128 providing convenient means to carry the gun. If desired, the coupling 26 may be connected to the dummy fitting 130 carried by the handle 128 so as to prevent injury to the coupling 26 or the flexible conduit 24, while the fitting 28 may be carried in the T-slot 134 in the base of the handle.

When another piece of apparatus is to be lubricated the fitting 28 is secured in place and the coupling 26 is connected thereto. If the opening through the fitting 28 should be clogged, or if any other opening through which lubricant is intended to flow becomes clogged, the tool 132, which is carried in the T-slot 134 in the handle 128, may be employed to open the passage.

When the coupling 26 has been connected to the fitting 28, the lever 118 is turned in a counterclockwise direction, as viewed in Fig. 2 of the drawings, so as to move the arm 114 from the latching or locking position to the release position. The lever 90 is now operated to rotate the gear 82 in the manner explained in detail above so as to force lubricant out through the flexible conduit 24, and the cycle of operation recited above is repeated, further rotation of the gear 82 being stopped by the arm 114 after substantially one revolution thereof.

The cylinder barrel 15 is of such size that it holds a quantity of lubricant sufficient to lubricate a large number of pieces of apparatus to be lubricated. When the supply of lubricant is exhausted, the piston 20 is returned to the upper end of its range of movement by turning the shaft 84 with a wrench which may grip the faces of the square end portion 110 of the shaft 84, while the pawl 94 may be held out of operative relation with the splines 93 on the member 92 by pressure applied to the release plunger 104.

When the shaft 84 and the gear 82 are turned in a counter-clockwise direction, as viewed in Fig. 5 of the drawings, the pin 112 carried by the gear 82 engages a side face of the arm 114, and moves the arm substantially into engagement with the projection 122 on the cover 86 and out of the path of movement of the pin 112 so that the pin may move past the arm 114 without interference.

On further movement of the gear 82, an end 126 of the projection 124 is moved between the wall of the chamber 70 and the projection or boss 115 on the end of the arm 114, so that on continued movement of the gear 82, the curved inner face of the projection 124 engages the boss 115 on the end of the arm 114, so that arm 114 is moved in a counterclockwise direction in a manner similar to that described above, with the result that the projection 124 will move past the boss on the arm 114 without interference.

On each successive revolution of the gear 82, the arm 114 is moved outwardly by the pin 112, while the projection 124 moves past the boss 115 on this arm and moves the arm inwardly as described above. After the piston 20 has returned substantially to the upper end of its range of movement, the head assembly 18 is removed from the cylinder barrel 15 and the supply of lubricant may be replenished.

From the foregoing it will be seen that this grease gun provides means to deliver lubricant under pressure in measured quantities, and that it incorporates locking means automatically operable after a predetermined amount of movement of the piston of the device to prevent further movement of the piston until the operator releases the locking means.

It will be seen also that upon release of the locking means, and upon further operation of the grease gun to supply lubricant, the locking means is automatically reset so as to prevent movement of the piston after a predetermined amount of movement thereof, and thereby cut off the supply of lubricant after a predetermined quantity has been supplied.

It will be seen further that this grease gun incorporates means by which the piston may be quickly returned to the upper end of the range of movement, and that the locking means is arranged so as not to interfere with this movement of the piston.

In addition it will be seen that the grease gun provided by this invention is of simple and rugged construction, and that it provides means to supply lubricant under sufficient pressure to force the lubricant through the lubricant passages in the apparatus to be lubricated.

While one embodiment of the improved grease gun provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a lubricating device, in combination, a cylinder adapted to contain a quantity of lubricant, a piston movable in said cylinder, manually operable means for effecting movement of the piston in the cylinder, a latch movable between a latching position and a release position, means associated with the piston and engageable with said latch on predetermined movements of the piston in a direction to expel lubricant from said cylinder when the latch is in the latching position to prevent further movement of the piston, manually operable means for moving the latch from the latching position to the release position to permit further movement of the piston, and means operable on further movement of the piston for moving the latch from the release position to the latching position.

2. In a lubricating device, in combination, a cylinder adapted to contain a quantity of lubricant, a piston movable in said cylinder, a rotatable member for effecting movement of the piston in said cylinder, a latch movable between a latching position and a release position, means rotatable with said rotatable member and engageable with said latch when the latch is in the latching position on each revolution of the rotatable member for preventing further movement of the piston after a predetermined amount of movement thereof, and manual means for moving the latch from the latching position to the release position to permit further rotation of said rotatable member.

3. In a lubricating device, in combination, a cylinder adapted to contain a quantity of lubricant, a piston movable in said cylinder, a rotatable member for effecting movement of the piston in said cylinder, a latch movable between a latching position and a release position, means associated with said rotatable member and engageable with said latch when the latch is in the latching position on each revolution of the rotatable member for preventing further movement of the piston after a predetermined amount of movement thereof, manual means for moving the latch from the latching position to the release position to permit further rotation of said rotatable member, and means carried by said rotatable member and operable on further rotation of the rotatable member for moving the latch from the release position to the latching position.

4. In a lubricating device, in combination, a cylinder adapted to contain a quantity of lubricant, a piston movable in said cylinder, a rotatable member for effecting movement of the piston in said cylinder, a latch movable between a latching position and a release position, means associated with said rotatable member and engageable with said latch when the latch is in the latching position on each revolution of the rotatable member for preventing further movement of the piston after a predetermined amount of movement thereof, manual means for moving the latch from the latching position to the release position to permit further rotation of rotatable member, and a cam segment carried by said rotatable member and operable on further rotation of said rotatable member to move the latch from the release position to the latching position.

5. In a lubricating device, in combination, a cylinder adapted to contain a quantity of lubricant, a piston movable in said cylinder, a rotatable member for effecting movement of the piston in said cylinder, a lever associated with said rotatable member, ratchet means associated with said lever and said rotatable member for permitting relative movement of said lever and said member in one direction and for preventing relative movement thereof in the other direction, manually operable means to condition the ratchet means to permit relative movement of said lever and said member in said other direction, and means for moving said rotatable member.

6. In a lubricating device, in combination, a cylinder adapted to contain a quantity of lubricant, a piston movable in said cylinder to expel lubricant from the cylinder, means including a rotatable member for effecting movement of the piston in said cylinder, an element associated with said member, a latch movable to a position in which said element engages said latch upon a rotative movement of said member to limit further rotative movement of said member, and means operable upon a rotative movement of said member for moving said latch into said position.

7. In a lubricating device, a cylinder, a piston movable in said cylinder to expel lubricant therefrom, a rotatable member for moving said piston and being operable on a plurality of revolutions to move the piston throughout its range of movement, a latch movable between a latching position and a release position, means rotatable with said rotatable member and engageable with said latch on each revolution of the rotatable member to prevent further movement of the rotatable member and of the piston, and means for moving the latch from the latching position to the release position to permit further movement of said rotatable member and of said piston.

8. In a lubricating device, a cylinder, a piston movable in said cylinder to expel lubricant therefrom, a rotatable member for moving said piston and being operable on a plurality of revolutions to move the piston throughout its range of movement, a latch movable between a latching position and a release position, means associated with said rotatable member and engageable with said latch on each revolution of the rotatable member to prevent further movement of the rotatable member and of the piston, means for moving the latch from the latching position to the release position to permit further movement of said rotatable member and of said piston, and means operable on further movement of the rotatable member to move the latch from the release position to the latching position.

9. In a lubricating device, a cylinder, a piston movable in one direction in said cylinder to expel lubricant therefrom, a rotatable member for moving said piston and being operable on a plurality of revolutions in a given direction to move the piston in said one direction throughout its range of movement, a latch movable between a latching position and a release position, means associated with said rotatable member and engageable with said latch on each revolution of the rotatable member in said given direction to prevent further movement of the rotatable member in said direction, means for moving the latch from the latching position to the release position to permit further rotation of the rotatable member, and means associated with the rotatable member and operable on further rotation thereof in said given direction to move the latch from the release position to the latching position, the latch and the means associated with the rotatable member being arranged to permit free movement of the rotatable member in the opposite direction.

10. In a lubricating device, in combination, a cylinder adapted to contain a quantity of lubricant, a piston movable in said cylinder, manually operable means for effecting movement of the piston in the cylinder, a latch movable between a latching position and a release position, means yieldingly opposing movement of the latch away from either of its positions, means associated with the piston and engageable with said latch on predetermined movements of the piston in a direction to expel lubricant from said cylinder when the latch is in the latching position to prevent further movement of the piston, manually operable means for moving the latch from the latching position to the release position to permit further movement of the piston, and means operable on further movement of the piston for moving the latch from the release position to the latching position.

11. In a lubricating device, in combination, a cylinder adapted to contain a quantity of lubricant, a piston mounted in said cylinder and operable on movement therein in one direction to expel lubricant therefrom, means for effecting movement of said piston in said one direction, an element movable in accordance with said piston, and a latch member associated with said cylinder and repeatedly cooperating with said element during a movement of the piston throughout its range of movement in said one direction to repeatedly arrest further movement of said piston.

12. In a lubricating device, in combination, a cylinder adapted to contain a quantity of lubricant, a piston mounted in said cylinder and operable on movement therein in one direction to expel lubricant therefrom, means for effecting movement of said piston in said one direction, an element movable in accordance with said piston, a latch member associated with said cylinder for engaging said element to prevent further movement of the piston upon movement of the piston to one position, and also engageable with said element to prevent further movement of said piston upon movement of said piston to another position.

13. In a lubricating device, in combination, a cylinder adapted to contain a quantity of lubricant, a piston mounted in said cylinder and operable on movement therein in one direction to expel lubricant therefrom, means for effecting movement of said piston in said one direction, an element movable in accordance with said piston, a latch member associated with said cylinder and engageable with said element on movement of the piston in said one direction to one position to prevent further movement of said piston, and also engageable with said element to prevent further movement of said piston upon movement of said piston to another position, and means for moving said latch member out of the path of movement of said element to permit further movement of said piston.

14. In a lubricating device, in combination, a cylinder adapted to contain a quantity of lubricant, a piston mounted in said cylinder and operable on movement therein in one direction to expel lubricant therefrom, means for effecting movement of said piston in said one direction, an element movable in accordance with said piston, and a latch member associated with said cylinder and repeatedly cooperating with said element after predetermined movements of said piston throughout its range of movement in said one direction to prevent further movement of said piston.

15. In a lubricating device, in combination, a cylinder adapted to contain a quantity of lubricant, a piston mounted in said cylinder and operable on movement therein in one direction to expel lubricant therefrom, means for effecting movement of said piston in said one direction, an element movable in accordance with said piston, a latch member associated with said cylinder and repeatedly cooperating with said element after predetermined movements of said piston throughout its range of movement in said one direction to prevent further movement of said piston, and means for moving said latch member out of the path of movement of said element to permit further movement of said piston.

16. In a lubricating device, in combination, a cylinder adapted to contain a quantity of lubricant, a piston mounted in said cylinder and operable on movement therein in one direction to expel lubricant therefrom, means for effecting movement of said piston in said one direction, an element movable in accordance with said piston, a latch member associated with said cylinder and engageable with said element on movement of the piston in said one direction to one position to arrest further movement of said piston, and also engageable with said element to prevent further movement of said piston upon movement of said piston to another position, means for moving said latch member out of the path of movement of said element to permit further movement of said piston, and other means movable in accordance with said piston and operative on further movement on said piston to move the latch member into the path of movement of said element.

ELLIS E. HEWITT.